(12) United States Patent
Voice et al.

(10) Patent No.: US 9,061,363 B2
(45) Date of Patent: Jun. 23, 2015

(54) BRAZED JOINING WITH ELECTRICAL DEPOSITION

(75) Inventors: Wayne E Voice, West Bridgford (GB); Richard C Dewes, Birmingham (GB); Martin R Bache, Swansea (GB); Stephen J Tuppen, Swadlincote (GB); Hong G Lee, Singapore (SG); David K Aspinwall, Coventry (GB)

(73) Assignee: ROLLS- ROYCE PLC, London (GB)

( * ) Notice: Subject to any disclaimer, the term of this patent is extended or adjusted under 35 U.S.C. 154(b) by 2569 days.

(21) Appl. No.: 11/478,772

(22) Filed: Jul. 3, 2006

(65) Prior Publication Data

US 2006/0249562 A1    Nov. 9, 2006

Related U.S. Application Data

(63) Continuation of application No. PCT/GB2004/005367, filed on Dec. 23, 2004.

(30) Foreign Application Priority Data

Jan. 23, 2004    (GB) .................................. 0401529.3

(51) Int. Cl.
*B23K 9/04*    (2006.01)
*B23K 3/06*    (2006.01)
(Continued)

(52) U.S. Cl.
CPC ................ *B23K 3/0607* (2013.01); *B23H 9/00* (2013.01); *B23K 1/0056* (2013.01); *B23K 1/008* (2013.01); *B23K 1/20* (2013.01)

(58) Field of Classification Search
USPC .......................... 219/76.1, 76.13, 85.1, 69.17; 228/262.6, 262.9
See application file for complete search history.

(56) References Cited

U.S. PATENT DOCUMENTS 3,626,137 A * 12/1971 Bertolasi et al. ........... 219/69.14
3,852,045 A * 12/1974 Wheeler et al. ............... 428/566
(Continued)

FOREIGN PATENT DOCUMENTS

EP    0 503 698 A    9/1992
GB    2 010 722 A    7/1979
(Continued)

OTHER PUBLICATIONS

Mostafa R. Reda, Fundamentals of the EDM Process, Sep. 1983, Arthur E. Brown, vol. V, 8.*
(Continued)

*Primary Examiner* — Dana Ross
*Assistant Examiner* — Ayub Maye
(74) *Attorney, Agent, or Firm* — Jeffrey S. Melcher; Manelli Selter, PLLC

(57) ABSTRACT

The present method creates a relatively thin in situ brazing alloy layer upon first and second component edges which are brought together in order to create a component joint. This in situ brazing alloy layer is created by deposition of brazing elements, such as copper or nickel, from an electrical discharge cutting process electrode depletion utilized in order to cut the component edges, and then a subsequent brazing technique creates through interstitial migration between that brazing alloy layer and the underlying material substrate of the components a robust component joint wherein the in situ brazing alloy layer penetrates the respective component cut edge surface to only a limited depth such that the geometric effect is similarly limited, and the properties of the underlying component material structure are maintained.

9 Claims, 2 Drawing Sheets

(51) Int. Cl.
*B23H 9/00* (2006.01)
*B23K 1/005* (2006.01)
*B23K 1/008* (2006.01)
*B23K 1/20* (2006.01)

(56) References Cited

U.S. PATENT DOCUMENTS

| | | | |
|---|---|---|---|
| 4,593,174 A | * | 6/1986 | Saito et al. ............ 219/137 WM |
| 4,996,111 A | | 2/1991 | Do-Thoi |
| 5,071,059 A | | 12/1991 | Heitman |
| 5,102,031 A | * | 4/1992 | Heitman et al. .............. 228/175 |
| 5,152,059 A | | 10/1992 | Midgley |
| 5,836,075 A | * | 11/1998 | Fitzgerald et al. ........... 29/889.2 |
| 5,994,659 A | * | 11/1999 | Offer .............................. 219/75 |
| 2004/0182843 A1 | * | 9/2004 | Schreiber et al. ........ 219/121.85 |

FOREIGN PATENT DOCUMENTS

| | | | | |
|---|---|---|---|---|
| GB | 2095589 | * | 4/1981 | .............. B23P 15/04 |
| GB | 2 095 589 A | | 10/1982 | |
| GB | 2095589 A | * | 10/1982 | ............. B23P 15/04 |
| JP | 02092875 A | | 4/1990 | |
| JP | 2004001069 A | | 1/2004 | |

OTHER PUBLICATIONS

Japanese Office Action (for Japanese Application equivalent to this U.S. Application) and Japanese Agent reporting letter dated Apr. 19, 2011.

* cited by examiner

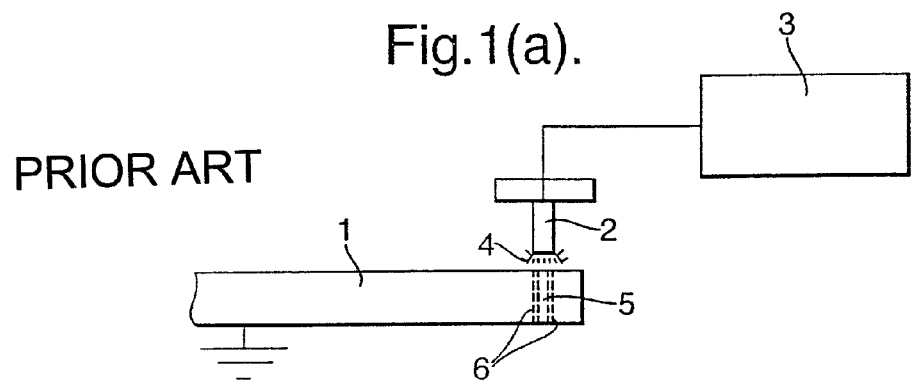
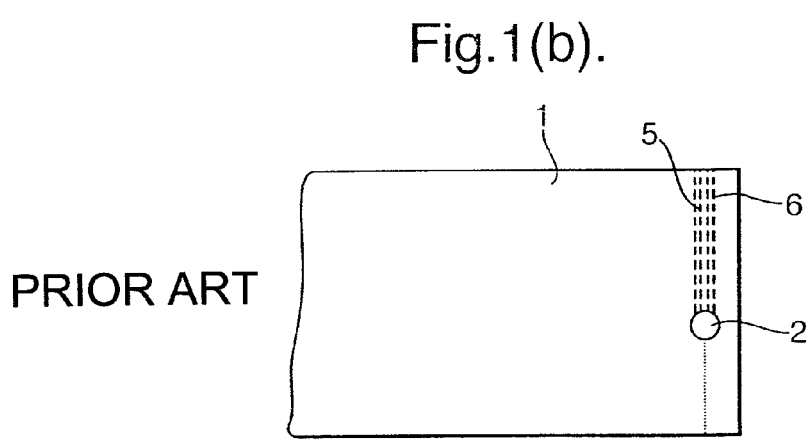
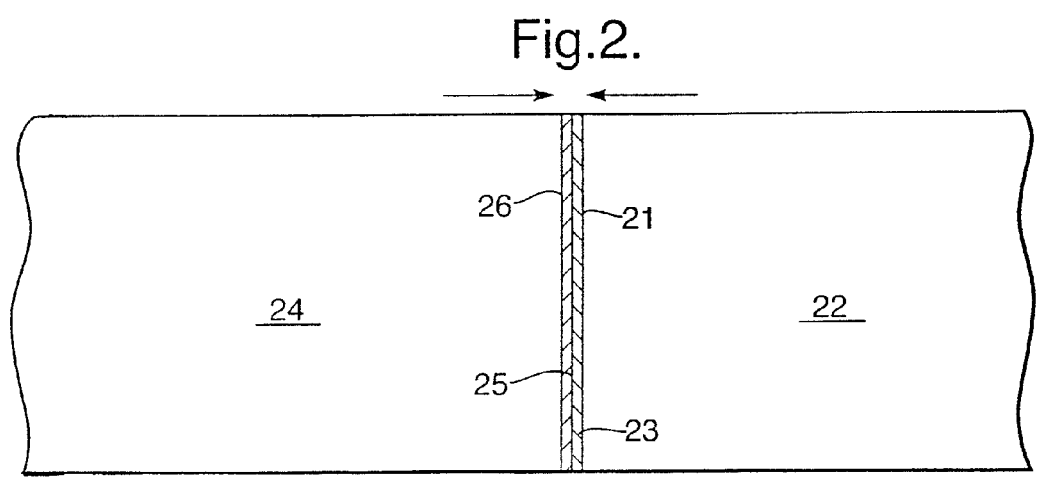

BRAZED JOINING WITH ELECTRICAL DEPOSITION

This is a continuation of International Application No. PCT/GB2004/005367 filed Dec. 23, 2004, designating the United States. This application claims foreign priority to Great Britain patent application No. 0401529.3, filed Jan. 23, 2004.

FIELD OF THE INVENTION

The present invention relates to component joining and more particularly to brazed joining between components used in engines.

BACKGROUND OF THE INVENTION

There are a number of situations where it is necessary to join components along edges in order to provide a desired structure. Brazing is one means of joining components. Brazing using low temperature melting point alloys is an established process with a number of different brazing alloy compositions and conditions applicable to different component material types, brazing techniques and eventual operational applications. Fusion joining processes introduce a cast structure and heat effected zone at the junction between components. This cast structure and heat effected zone are generally detrimental to the properties of the eventual structure form. Thus, avoiding the necessity to melt the substrate of the component to form the joint between components should be advantageous.

SUMMARY OF THE INVENTION

In accordance with the present invention there is provided a method of forming a component joint, the method comprising cutting at least a first edge of a component by electrical deposition technique whereby there is a migration of brazing elements from the electrical deposition technique into the edge in order to form an in situ brazing alloy layer upon that edge, bringing a second edge into a juxtaposed position to the first edge and causing heating there about to form a brazed union between the first edge and the second edge.

Typically, with Ti alloys the brazing elements are copper or nickel.

Possibly, the electrical deposition technique is performed under an electrolyte including particulate matter such as carbon which may become incorporated into the brazing alloy layer. Possibly, both the first edge and the second edge are cut by electrical deposition techniques. Further, possibly the brazing alloy layer formed about the first edge is different from the brazing alloy layer formed about the second edge in terms of constituent composition.

Preferably, the electrical deposition technique provides for undulating topography along the edge. Possibly, the first edge and the second edge are matched in terms of undulations. Additionally, the electrical deposition technique generally renders the edge with a porous nature.

Advantageously, the first edge and the second edge are pressed together into the juxtaposed position.

Generally, the means for causing heating is through resistive or laser heating between the first and second edges under compression or otherwise. Alternatively, the first edge and the second edge may be heated in a furnace in order to form the brazed union.

Possibly, the first edge and the second edge are provided in the same component in order that the brazed union forms a seam in a structure there along.

Also in accordance with the present invention there is provided a component incorporating a component joint formed in accordance with a method as described above.

The present invention also includes a component with an edge surface cut by an electrical discharge technique whereby through choice of an electrode for that technique a desired brazing alloy layer is formed at the edge surface by migration of brazing elements from the electrode.

BRIEF DESCRIPTION OF THE DRAWINGS

The embodiments of the present invention will now be described by way of example and with reference to the accompanying drawings in which:

FIG. 1 is a schematic illustration of electro discharge cutting with FIG. 1a depicting a side cross section whilst FIG. 1b depicts a plan view;

FIG. 2 is a schematic plan view illustrating a component joint formed in accordance with the present invention;

DETAILED DESCRIPTION OF THE INVENTION

Figure 3:
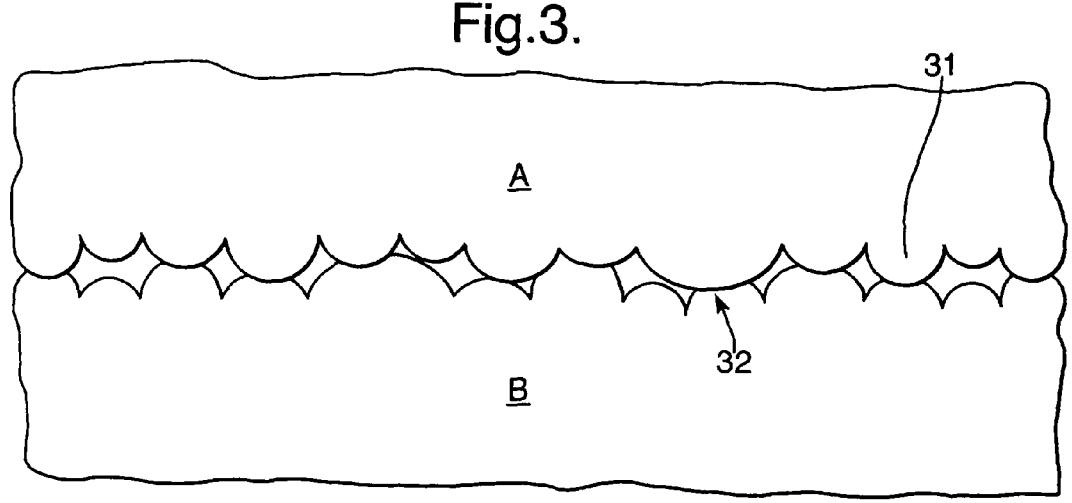
FIG. 3 is a schematic plan view illustrating the contact surfaces of component sections in accordance with the present invention; and, FIG. 4 is a schematic plan view illustrating a refined edge combination in accordance with the present invention.

The present invention relates to a joining method by brazing edge surface modified components. The new method uses electro-discharge machining to cut a component such as a sheet to the required joint geometry. The electro-discharge machining is carried out with an electrode composition that under pre-determined conditions modifies the cut edge surface composition to a suitable brazing alloy. The thin brazing alloy layer created on the cut edge surface coupled with the fine undulating surface topography generated by electro-discharge machining permits a strong component joint to be formed after subsequent bulk or localised brazing heating. An example is the joining of blades or stators to produce 'packs' ready for ease of assembly and to reduce vibration during use. The method is also applicable to components that require strong bonds in thin sheet sections where fusion and conventional brazing processes result in weak structures. Example components are combustor and compressor casings and exhaust fabrications particularly with titanium-based alloys.

Electrical discharge cutting is a well known process. FIG. 1 provides a very simplistic outline of that process. Thus, a component 1 is positioned relative to an electrical discharge electrode 2 whereby through an electrical potential between that component 1 and an electrical source 3, a spark 4 is created in order to provide a cut 5 in the component 1. It will be understood in the electrical discharge process or technique the electrode 2 is consumed by the cutting process. It is by choice of an appropriate electrode 2 composition that brazing elements can be introduced into cut edge surface portions in order to create a brazing alloy layer 6 thereabout. In short these brazing elements, which are typically copper or nickel, migrate into the substrate material of the component at these cut edge surfaces.

Brazing is also a well known technique utilising low temperature melting point alloys in order to create a component junction between juxtaposed surfaces. In such circumstances it will be appreciated that brazing alloy compositions and conditions of joint formation to allow different component substrate materials, brazing techniques and operational applications to be used are developed and specified as required by particular conditions. As indicated above, it is advantageous to avoid melting of the substrate material from which a component is made in order to eliminate problems with a cast structure and a heat effected zone of detrimental properties. Typical brazing techniques usually require excess brazing alloy to be added to ensure that a fully consolidated component joint is formed. This excess of brazing alloy introduces weak sections at the component junction. However, in accordance with the present invention, modification of the cut edge surface composition to form an in situ brazing alloy layer 6 ensures minimum addition of joining or brazing materials so that a strong bond is produced free from weakened sections. It will be appreciated that the in situ brazing alloy formed by migration of brazing elements from the electro discharge electrode will generally be diffused into the cut edge surface substrate. Furthermore to avoid the necessity of adding brazing alloy in its self is a significant cost reduction. Additionally, in the case of interference fit joints it will be understood that external support is not required since the components are interference fitted together utilising the surface topography resulting from the electrical discharge technique. This topography is due to the formation of a globular surface by the electrical discharge technique (see FIG. 3).

The present method as indicated comprises initially providing electrical discharge cutting of a component in order to provide a modified cut edge surface, and this is then followed by a brazing process utilising the modified brazing alloy surface layer created. Electrical discharge surface brazing alloy creation in titanium alloys can be undertaken by electrical discharge from wire cutting utilising a nickel or copper wire electrode under suitable conditions. Typically, these conditions involve performing the electrical discharge under a liquid electrolyte. The resultant edge cut surface will generally have a roughened, globular, texture with the result that there is a high electrical resistance when an electrical current is passed across juxtaposed edges to be formed into a component joint. It is at the core of the present invention that the modified surface in the form of a brazing alloy layer is achieved from migration and deposit of brazing elements such as copper and/or nickel, from the electrode cutting tool electrode or wire of the electrical discharge apparatus. The created brazing alloy layer will have a melting temperature significantly below that of the substrate parent material of the component. The brazing alloy layer in such circumstances is able to uniformally wet the edges during the brazing process to achieve the component joint as described.

An example of a typical electrical discharge cutting technique conditions are as follows:

With a Charmilles Technologies Robofil 200 5-axis EDWM machine, the component to be cut is submerged in a de-ionised water dielectric (10 μs/cm conductivity). An Erodex copper wire electrode is used cutting a 5 mm wide gamma titanium aluminide substrate material component in a roughening mode with a 200V open circuit voltage achieving a duty factor of 50%. With negative polarity, 8A peak current and 1 μF capacitance, the necessary results are achieved by pulsing on timings of 6.4 μs, with the result that there is a 50 μm copper alloy deposition layer at a roughness of Ra-5 μm.

In the above circumstances, it will be appreciated that the particular electrode used in terms of its composition and configuration, as well as the speed and arc voltage will be significantly determinant with respect to brazing element deposition and migration into the cut surface in order to create the in situ brazing layer on the cut edge surface in accordance with the present invention. Similarly, the degree of penetration by that deposited or migrating brazing element typically in the form of copper or nickel will be determined by these factors as well as the matrix structure of the component material substrate in terms of its receptiveness to such migration. Nevertheless, as indicated above, typically there will be a 50 μm brazing alloy deposition layer upon the cut edge surface. Such thickness of brazing alloy layer should be sufficient to achieve an appropriately robust component joint.

At least one of the juxtaposed abutting edge surfaces to form a component joint in accordance with the present invention must be cut using the electrical discharge technique described above in order to provide an in situ brazing alloy layer. However, normally both edge surfaces will be so cut by an electrical discharge technique as described in order to provide respective brazing alloy layers on each edge surface. These brazing alloy layers may have different constituent compositions with respect to their respective brazing alloy for particular requirements in achieving a robust and strong component joint after the brazing process.

A titanium alloy material component substrate with a copper modified brazing alloy layer is joined typically by a resistance brazing technique. Such resistance brazing techniques are possible by placing appropriate geometries of the juxtaposed abutting edges into a thermo mechanical unit. This thermo mechanical unit adjusts the elevated temperatures to in the region of 950° C. at the juxtaposed abutting edge surfaces via an electrical resistance heating process. Normally the abutting edge surfaces will be held in a compressive state for around 30 seconds in order to ensure that the brazing alloy layer attains a liquid phase. Subsequently these held edges take a few minutes duration to allow elemental diffusion across the brazing alloy layer into the opposed parent component substrate alloy. Typically, the force to make the bond will be in the order of 25 Mpa and is applied in conjunction with an appropriate thermal cycle to assist such brazing processes in order to provide a brazed joint. To avoid any problems with oxidation this process is normally conducted under a vacuum.

FIG. 2 is a simplified illustration of the brazing stage of the component joining method in accordance with the present invention. Thus, a first edge 21 in a component 22 has a brazing alloy layer 23 whilst a second component 24 has a second edge 25 which itself has a brazing alloy layer 26. Thus, the first and second edges 21, 25 are brought into compressive engagement and resistive heating applied such that the brazing alloy layers 23, 26 move into a liquid phase. In such circumstances there is elemental diffusion between the brazing layers 23, 26 and upon cooling a suitably robust component joint is provided.

By utilising the present component joining method it is possible to produce packs of blades or stators for a turbine engine made from gamma titanium aluminide. As the present method eliminates excessive internal stress and micro structures inherent with previous fabrication techniques, such packs of blades or stators will be able to achieve the necessary operational performance within a turbine engine. It will also be understood that it is relatively easy to achieve tolerances in the final blade or stator package as there is less relative movement of surfaces during the present method for component joining or bonding of the blades or stators together.

As indicated above, at least one of the edges of a component to be joined is electrically discharge shaped to an appropriate geometry using electrodes and conditions which create the desired brazing alloy layer in the surface of that cut edge. This brazing alloy layer again as indicated is achieved through deposition and addition of brazing elements from the electrode in small amounts in order to achieve a brazing alloy at the surface location. Typically the electrical discharge cutting process creates an undulating topography which is also possibly of a relatively porous nature. This undulating topography is due to the solidification of small globules of the electrical discharge spark melted substrate material of the component as well as the brazing elements from the electrode into the brazing alloy as described. Such undulating topography is depicted in FIG. 3 where section A is brought into an interference fit with section B with undulating respective topographies 31, 32 juxtaposed and in compressive engagement.

In the case of an interference fit between component edges, the pressing of a first edge or side on one component section, together with a second edge or side of another component section causes interlocking of the surfaces 31, 32 due to the undulating nature as well as shearing of surface peaks so as to help fill depressions within material. The application of heat in addition to this interlocking compression facilitates the brazing process for elemental diffusion therebetween and therefore creation of a robust component joint. In any event subsequent brazing to consolidate the component joint can involve localised heating such as by resistance heating integral to a pressing operation between the undulating surfaces 31, 32 or by heating the whole component structure in a furnace.

As indicated above previous component manufacturing processes result in inferior properties due to the effects of fusion welding or brazing processes. The present invention minimises disruption to the substrate materials normally caused by melting or by addition of excessive brazing joining material. In such circumstances the component joint is stronger and closer to the adjacent substrate properties. In short, the in situ brazing alloy layer created by deposition and migration of brazing elements into the cut edge surface is of limited depth and therefore has limited effect upon the underlying material substrate properties of the material from which the component is formed.

Figure 4:
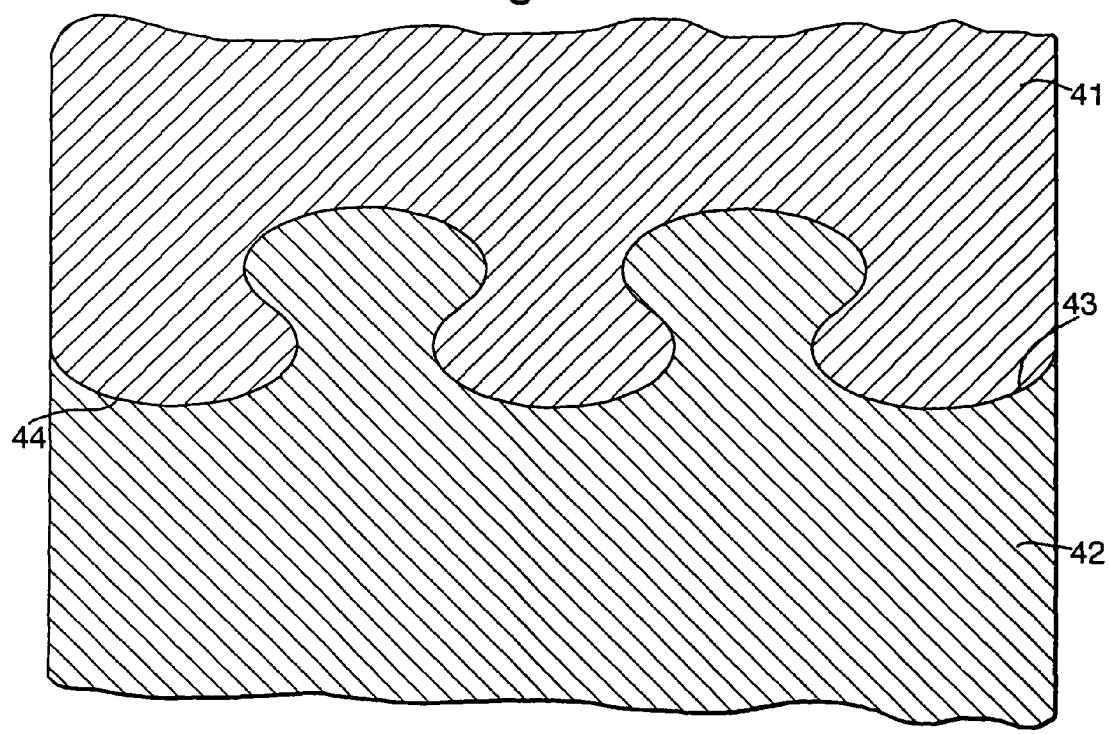

Clearly, the electrical discharge cutting process or technique as illustrated with regard to FIGS. 1 and 2 can form a straight edge. Alternatively, as depicted in FIG. 4 this process can create a geometric interlocking edge. In such circumstances respective components or component segments 41, 42 may be positioned with their respective edges 43, 44 in an interlocking relationship in order to form a sheet or continuous structure. These edges 43, 44 as described above through utilising the electrical discharge technique will have a brazing alloy layer which upon subsequent brazing ensures a brazing joint is created across the edges 43, 44.

The present method of forming a component joint may be utilised with regard to coupling together two or more discrete components or be utilised in order to create cylinders through securing opposed first and second edges in the same component. In any event a component structure is formed utilising the present method which has an in situ brazing alloy layer creating stage through utilising electrical discharge techniques for cutting that edge, and then a subsequent brazing process. The electrical discharge cutting process creates a relatively thin brazing alloy layer through deposition of brazing elements from the electrical discharge element and this thin brazing alloy layer then allows formation of an appropriately robust component joint without introduction of excess brazing alloy material or geometrically extensive effects far beyond the component joint.

In the above circumstances the present method avoids the purchase and application of expensive brazing alloy which in itself may weaken the eventual component joint. Furthermore, difficult component substrate material combinations may be more easily joined due to the creation of a fine brazing alloy layer on each component cut edge surface with these respective brazing alloy layers then intermingling in order to form the component joint.

As indicated previously, different brazing alloy layer compositions may be achieved by use of different electrical discharge electrodes and cutting conditions, etc. In such circumstances different brazing alloy surfaces can be applied to the two halves of a component joint, thus permitting different material substrates to be joined together more conveniently.

The reduced internal stressing and micro structures created by the present method allow utilisation of that method with regard to structures such as a turbine engine cylindrical combustor casing formed from gamma titanium aluminide alloy sheet which was not possible previously with fusion welding techniques. Simple brazing suffers from pressure support problems as well as detrimental phase formation from elements in the brazing alloys. Creation of a thin in situ brazing alloy layer about the cut edge surfaces reduces stresses and micro structures whereby these problems are relieved. In order to create such a cylindrical combustor casing, typically pre forma gamma titanium aluminide alloy sheet panels, typically three, are formed notionally to the desired shape. Edges of these panels are then machined using an electrical discharge technique. Thus the cut surface edges are modified by the electrical discharge electrode to produce matching interference fitting geometric joints (see FIGS. 3 and 4). These matching interference fitting geometric joints (FIG. 4) are then brought into juxtaposed association and pressed whereby the component sections are held in engagement. When appropriately positioned the whole assembly is heat treated in a furnace to induce brazing through the in situ brazing alloy layers created by the electrical discharge process or technique described above. Again, the stresses within the structure are limited to the narrow depth of the in situ brazing alloy layer so that the bulk of the component substrate structure is unaffected whilst the respective brazing alloy layers are sufficiently intermingled through elemental diffusion to create a robust component joint therebetween.

As indicated above, the present method has applicability to a wide range of component structures. However, it will be appreciated that the problems associated with excessive interior stress and micro structures from a simple brazing technique must be sufficiently severe to justify the additional process steps of creating an in situ brazing alloy layer using an electrical discharged electrode deposition/migration of brazing elements into cut edge surfaces for that brazing alloy layer.

As indicated above, generally the electrical discharge technique is performed immersed in an electrolyte such as distilled water. Where desirable in order to supplement or alter the eventual brazing alloy composition, it may be possible to introduce particulate matter into the electrolyte. This particular matter such as graphite or carbon may be introduced in order to become part of the brazing alloy position and so alter that brazing alloy properties, both improving the component joint and its operational performance as part of the component joint eventually created.

The invention claimed is:

1. A method of forming a component joint, the method comprising:
    cutting at least a first edge of a first component and a second edge on the first component or on a second component by electrical deposition technique using an electrode comprising at least one brazing element selected from copper or nickel such that there is a migration of the at least one brazing element from the electrical deposition technique into the first edge and the second edge in order to form an in situ brazing alloy layer upon the first edge and the second edge;

bringing the second edge into a juxtaposed position to the first edge; and heating the first and second edges to form a brazed joint between the first edge and the second edge.

2. A method as claimed in claim 1 characterized in that the electrical deposition technique is performed under an electrolyte including particulate carbon matter which becomes incorporated into the brazing alloy layer.

3. A method as claimed in claim 1 characterized in that the brazing alloy layer formed about the first edge is different from the brazing alloy layer formed about the second edge in terms of constituent composition.

4. A method as claimed in claim 1 characterized in that the electrical deposition technique provides for undulating topography along the first and second edge.

5. A method as claimed in claim 1 characterized in that the electrical deposition technique renders the first and second edge with a porous nature.

6. A method as claimed in claim 1 characterized in that the heating means is through resistive or laser heating between the first and second edges under compression.

7. A method as claimed in claim 1 characterized in that the first edge and the second edge are heated in a furnace in order to form the brazed joint.

8. A method as claimed in claim 1 characterized in that the first edge and the second edge are provided in the first component in order that the brazed joint forms a seam in a structure there along.

9. A method as claimed in claim 4 characterized in that the first edge and the second edge are matched in terms of undulations.

* * * * *